Patented July 9, 1940

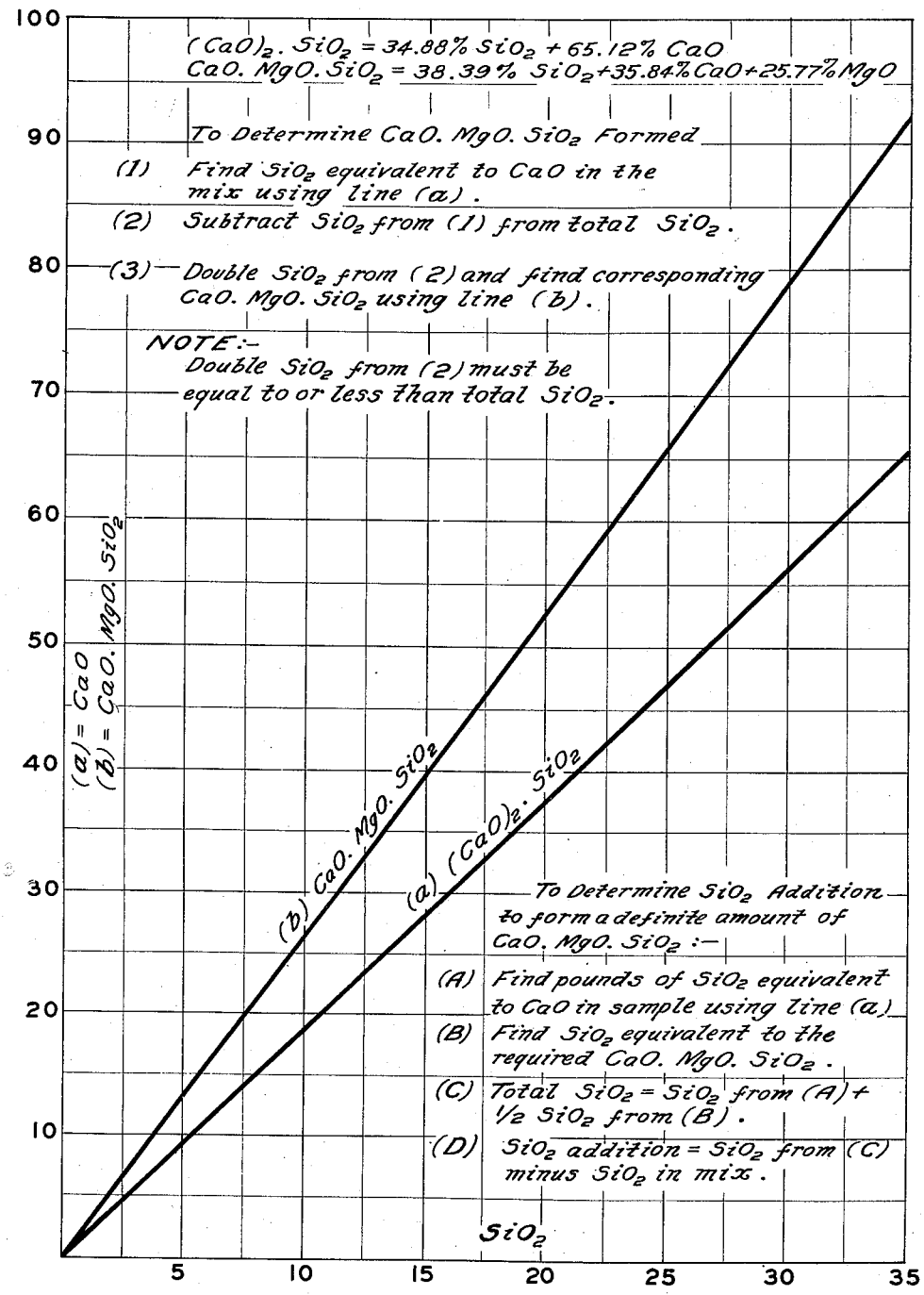

2,207,557

UNITED STATES PATENT OFFICE 2,207,557

HIGH MELTING POINT SILICATE REFRACTORY

Gilbert E. Seil, Cynwyd, Pa., assignor to E. J. Lavino and Company, Philadelphia, Pa., a corporation of Delaware Application January 28, 1937, Serial No. 122,786

4 Claims. (Cl. 106—9)

This invention relates to stable, high melting point silicate refractory materials and to the production thereof.

Magnesia refractories have found a wide application in industrial practice. These magnesia refractories are usually prepared from magnesia materials, such as magnesite, which after heating to stabilization become mainly periclase. Other magnesia bearing materials, such as dolomite, which contain, in addition to magnesia, appreciable amounts of lime, have also found some application as refractory materials. The use of these latter materials has been very limited, due to the fact that it has not been previously possible to maintain the lime in a stable condition either by dead burning or by chemical correction. Whenever free lime (CaO) is present in a refractory body, there is a definite tendency toward hydration and disintegration in the presence of any moisture. In addition, free lime causes the body to be exceedingly basic. Free lime is a very reactive material and is used extensively in the refining of steel. It reacts with nearly every slag used in metallurgical practice.

Because of its tendency toward hydration, its great chemical reactivity and its extreme basicity, free and uncombined lime, that is calcium oxide, is a very undesirable constituent of refractory bodies, despite its high melting point. Crystallized magnesium oxide, that is, periclase, is also a ...sic refractory material, but exhibits these characteristics to a much lesser extent than calcium oxide, and as stated above, is sufficiently stabilized by heat treatment for use in refractory bodies.

It is one of the objects of this invention to convert raw materials containing magnesia and appreciable amounts of lime, into high melting point, stable and nearly neutral refractory materials by the formation in the body of stable and high melting points compounds of calcium.

This object is accomplished by heat treating the starting materials in intimate mixture with silica, forming in accordance with the amount of silica used, dicalcium silicate with monticellite. Dicalcium silicate (or calcium orthosilicate— $2CaO.SiO_2$) has a melting point of $3866°$ F., is a neutral material and does not react readily with either acids or bases. Monticellite, on the other hand, is the orthosilicate of lime and magnesia ($CaO.MgO.SiO_2$) and melts or decomposes at $2728°$ F. The magnesia in the starting material becomes periclase in the finished refractory.

If the amount of silica present is in a molecular percentage greater than that required to convert all the lime present to calcium orthosilicate, then a portion of the lime, and a portion of the magnesia react with a portion of the silica to yield monticellite. In other words, if the molecular percentage of silica exactly equals the molecular percentage of lime, then these two will unite with an equal molecular percentage of magnesia to form monticellite. If, on the other hand, the molecular percentage of lime is twice the molecular percentage of silica, then only calcium orthosilicate is formed. Percentages between these two figures yield a material containing both calcium orthosilicate and monticellite. In other words, the ratio of lime to silica determines definitely whether the mixture is to contain calcium orthosilicate or monticellite or a mixture of these two compounds.

It is a further object of this invention to predetermine the amounts of calcium orthosilicate and monticellite which will be formed in the refractory body. Since there is a difference of over $1000°$ F. between the melting points of these two compounds, the calcium orthosilicate is considered as a refractory component of the body, whereas the monticellite, because of its lower melting point, becomes the secondary component. The amount of monticellite affects the fusibility of the mass and affects the firing temperature of the shaped product.

The accomplishing of this control of the amounts of calcium orthosilicate and of monticellite which will be formed in the refractory body lies in the control of the amount of silica present in the mixture from which the refractory body is made. Following are the formulae for computing (1) the amount of monticellite which will be formed in a mixture of given analysis, and (2) the addition of silica necessary to obtain a predetermined amount of monticellite in the finished product:

(1) To determine the amount of monticellite which will be formed in a given mixture:

Let X=number of pounds of $(CaO)_2.SiO_2$ which will be formed and $Y$ = number of pounds of $CaO.MgO.SiO_2$ which will be formed.

Since $(CaO)_2.SiO_2$ contains 65.12% CaO and 34.88% $SiO_2$, and

Since $CaO.MgO.SiO_2$ contains 35.84% CaO and 38.39% $SiO_2$

Then $.6512X + .3584Y = \#CaO$ and $.3488X + .3839Y = \#SiO_2$ $(.6512)(.3488)X + (.3584)(.3488)Y = .3488(\#CaO)$
$(.6512)(.3488)X + (.6512)(.3839)Y = .6512(\#SiO_2)$ $.125Y - .250Y = .3488(\#CaO) - .6512(\#SiO_2)$
$.125Y = .6512(\#SiO_2) - .3488(\#CaO)$
$Y = 5.2096(\#SiO_2) - 2.790(\#CaO)$ This formula may also be derived as follows:

$Y$ = number of pounds of monticellite formed $= (2)(\text{mol. wt. } CaO.MgO.SiO_2)\left[\text{mols } SiO_2 - \dfrac{\text{mols of } CaO}{2}\right]$ $= 2(156.45)\left[\dfrac{\#SiO_2}{60.06} - \dfrac{\#CaO}{2(56.08)}\right]$ $= 312.90\left[\dfrac{\#SiO_2}{60.06} - \dfrac{\#CaO}{112.16}\right]$ $= \dfrac{312.90(\#SiO_2)}{60.06} - \dfrac{312.90(\#CaO)}{112.16}$ $= 5.2096(\#SiO_2) - 2.790(\#CaO)$ A third method for the derivation of this formula follows:

$\#SiO_2 \text{ in } CaO.MgO.SiO_2 = 2\left[\#SiO_2 - \#CaO\dfrac{\text{mol. wt. } SiO_2}{2(\text{mol. wt. } CaO)}\right]$ $= 2\left[\#SiO_2 - \#CaO\dfrac{60.06}{2(56.08)}\right]$ $= 2[\#SiO_2 - .5355\#CaO]$ $= 2\#SiO_2 - 1.0710\#CaO$ Since $CaO.MgO.SiO_2$ contains 38.39% $SiO_2$ $Y$ = number of pounds of monticellite formed $= \dfrac{(2\#SiO_2 - 1.071\#CaO)}{.3839}$ $= 5.2096(\#SiO_2) - 2.790(\#CaO)$ (2) From the above formula the required $SiO_2$ addition is determined as follows:

$\#CaO.MgO.SiO_2 = 5.2096(\#SiO_2) - 2.790(\#CaO)$
$5.2096(\#SiO_2) = \#CaO.MgO.SiO_2 + 2.790(\#CaO)$
$\#SiO_2(\text{total requirement}) =$
  $.1919(\#CaO.MgO.SiO_2) + .5355(\#CaO)$
$SiO_2$ addition = total $\#SiO_2 - \#SiO_2$ in raw materials.

In the computation of these formulae, accurate atomic weight values, as published in the Journal of The American Chemical Society for April 1936 (volume 58, No. 4) were used. In the examples which follow, showing industrial applications of the invention, the approximately correct molecular weights of $CaO = 56$, $MgO = 40$ and $SiO_2 = 60$ are used. These figures are sufficiently accurate for industrial calculations because of the limits of the accuracy of large scale industrial equipment.

It is a known fact that calcium orthosilicate exists in two forms, with a great difference in specific gravity and in specific volume between the two forms. I have found, however, that by the addition of a small percentage of phosphate to the mixture, the crystalline form, which is stable at high temperatures without the addition of the phosphate becomes stable at low temperatures, and that the tendency of the lime toward hydration has become completely destroyed by converting it to the stable orthosilicate, and that the magnesia remains as periclase. Borates or compounds containing boric acid may also be used for this stabilization, but their effects are somewhat deleterious to the physical characteristics of the finished refractory. Phosphates are much cheaper and much more effective. It is preferable to use dilute phosphoric acid for tempering the mass prior to burning in order to obtain the maximum distribution of the stabilizing agent. Hence, the conversion of a predetermined amount of the lime to a stable, refractory crystalline compound is a further object of this invention.

The process of this invention is such that the temperature at which the grains can be made to adhere to one another, which temperature determines the proper firing temperature of the shaped product, can be controlled by the formation in the mass of a predetermined amount of monticellite. I have obtained satisfactory results with the refractory shapes of this invention within the range of 1% to 50% of monticellite. Thus the control of the firing temperature of the shaped refractory body is another object of this invention.

Other advantages and objects will be seen in the following directions for putting the invention into practice:

1. I prepare a mixture of dolomitic material, the necessary silica to form the desired amounts of calcium orthosilicate and monticellite on stabilization, and enough phosphate bearing material to yield approximately one-half of one percent of $P_2O_5$ in the finished refractory.

2. The mixture as in (1) is ground, and preferably formed into briquettes or adobes, and then heat treated to stabilization without fusion of the mass in a suitable kiln and to a dense structure. Stabilization as used in this description means that the mass has been heated to or above the critical temperature at which all the silica is converted to calcium orthosilicate and monticellite, but below the fusion point of the mass so that the mass is in chemical and physical equilibrium.

3. The stabilized clinker obtained in (2) is ground to suitable specifications as to particle size or proportion of sizes for the making of refractory products such as bricks, cements, or plastics, and thereafter may be used in the manufacture of such refractory products, or may be sold as such. If the clinker is pressed into refractory shapes, these shapes are burned in the usual manner either in a periodic or in a tunnel kiln. In the making of such shapes, a small addition of the raw mix, or a small addition of finely ground dead burned magnesia may be made to the prepared material.

Typical examples follow:

In each of these samples sufficient phosphate bearing material is added to the raw mix to yield one-half of one percent of $P_2O_5$ in the finished product. This addition of phosphate bearing material is not shown in the tabulation.

Analysis of dolomitic starting material

| | Percent |
|---|---|
| CaO | 29.34 |
| MgO | 22.16 |
| $SiO_2$ | 1.29 |
| $CO_2$ | 47.21 |

Analysis of silica flour

| | Percent |
|---|---|
| $SiO_2$ | 99.00 |

| | Example I | Example II | Example III |
|---|---|---|---|
| Raw materials: | | | |
| Dolomite.............pounds.. | 100.0 | 100.0 | 100.0 |
| Silica...................do.... | 14.4 | 15.8 | 21.0 |
| Analyses—raw mixtures: | | | |
| CaO....................percent.. | 25.64 | 25.34 | 24.25 |
| MgO....................do.... | 19.37 | 19.13 | 18.30 |
| $SiO_2$...................do.... | 13.73 | 14.78 | 18.42 |
| $CO_2$...................do.... | 41.26 | 40.75 | 39.03 |
| Chemical analyses—burned products: | | | |
| CaO....................percent.. | 43.65 | 42.77 | 39.80 |
| MgO....................do.... | 32.98 | 32.28 | 29.95 |
| $SiO_2$...................do.... | 23.37 | 24.95 | 30.25 |
| Mineral analyses—burned products: | | | |
| Periclase................percent.. | 33.00 | 29.50 | 17.70 |
| Calcium orthosilicate....do.... | 67.00 | 59.80 | 34.70 |
| Monticellite.............do.... | None | 10.70 | 47.60 |

I have discovered that there is a critical temperature below the fusion point of the mass at which mixtures containing calcium oxide, magnesia, and silica can be stabilized by the formation of periclase and monticellite, or by the formation of periclase and calcium orthosilicate, or by the formation of periclase, calcium orthosilicate and monticellite, depending upon the ratios of these constituents. Whenever stabilization above the fusion point of a mixture of various materials is carried out, examination of the cast products shows segregation and non-uniformity, due to the rapid cooling as small crystals of the highest melting point compounds on the outside surfaces, and segregation of the lower melting point compounds as large crystals toward the center of the block. Such blocks show not only non-uniform chemical composition, but also vary greatly in density from the outside surfaces to the center. The product of this invention, on the contrary, is substantially uniform and homogeneous, both in composition and in structure.

When the chemical analysis of the starting material is known, the silica addition for the formation of a predetermined amount of monticellite in the finished refractory body can be made. Although we have used dolomite in the examples given in this specification, there can be used any raw material or mixture of raw materials containing lime and magnesia to which silica can be added, so that after heating the mixture until it has been stabilized chemically, there will be formed either calcium orthosilicate, monticellite, or periclase, or any mixture ther f.

The following set of equations, in which the mechanism of reaction is shown step by step, using proportions of starting materials within the range shown in the examples and approximating Example II (but expressed in round numbers of moles) makes more evident the effect of control of the amounts of the reacting materials.

Starting mix 2 moles of $MgCO_3$
2 moles of $CaCO_3$
1.05 moles of $SiO_2$

Mechanism of reaction (1) 2 moles $CaCO_3.MgCO_3$ (dolomite) + 1.05 moles $SiO_2$ (silica) → 2 moles CaO (lime) + 2 moles MgO (periclase) + 1.05 moles $SiO_2$ (silica) + 4 moles $CO_2$ (carbon dioxide gas)

(2) 2 moles CaO (lime) + 1.05 moles $SiO_2$ (silica) + 2 moles MgO (periclase) → 1.05 moles $CaO.SiO_2$ (wollastonite) + .95 mole CaO (lime) + 2 moles MgO (periclase)

(3) 1.05 moles $CaO.SiO_2$ (wollastonite) + .95 mole CaO (lime) + 2 moles MgO (periclase) → .95 mole $2CaO.SiO_2$ (calcium orthosilicate) + 0.10 mole $CaO.SiO_2$ + 2 moles MgO (periclase)

(4) 0.10 mole $CaO.SiO_2$ (wollastonite) + 2 moles MgO (periclase) → .10 mole $CaO.MgO.SiO_2$ (monticellite) + 1.90 moles MgO (periclase)

End product:
.95 mole $2CaO.SiO_2$ (calcium orthosilicate)
1.90 moles MgO (periclase)
.10 mole $MgO.CaO.SiO_2$ (monticellite)

The calculated mineralogical analysis of the end product (the parts by weight of each constituent being determined by multiplying the number of moles by the molecular weight) is:

| | | Per cent |
|---|---|---|
| $2CaO.SiO_2$ | (parts by weight—0.95× 172.20=163.590) | 63.97 |
| MgO | (parts by weight—1.90× 40.32= 76.508) | 29.91 |
| $CaO.MgO.SiO_2$ | (parts by weight—0.10× 156.45= 15.645) | 6.12 |
| (Total parts by weight | 255.743) | 100.00 |

When the mixture of dolomite and silica is first heated there is practically no reaction between the silica and the dolomite until the dolomite has lost a part of or all of its carbon dioxide and is converted to calcium oxide (lime) and magnesium oxide (periclase). At the temperature at which this takes place, there is little crystal growth. The crystals are probably of molecular magnitude.

As the temperature increases, the silica begins to react with the lime, which is the stronger base, until it has united with an equi-molecular quantity of lime yielding a complex corresponding to wollastonite ($CaO.SiO_2$).

The larger portion of the complex corresponding to wollastonite in turn takes up the remaining unused lime, yielding calcium orthosilicate. The remainder of the complex corresponding to wollastonite then is used up by uniting with an equi-molecular quantity of periclase to yield monticellite. The larger portion of periclase remains unreacted.

This sequential action, brought about by heating the mixture above the critical temperature at which the chemical reactions are completed, but below the fusion point of the mass, produces a final product in which there has been no appreciable migration of the starting materials from their relative original positions or placements while forming the periclase and the reaction products.

Observance of the temperature range is an important feature of the practice of this invention. By heating the starting mixture to a temperature above the critical point at which the chemical reactions are completed, but below the fusion point of the mass, there is obtained a corrected basic refractory material, chemically uniform and physically homogeneous, in which the placement of the reaction products and the crystals formed have been under precise control.

The starting mixture must be heated above the temperature at which the chemical reactions are completed to yield a product consisting of calcium orthosilicate, periclase and monticellite, and to assure the decomposition of any merwinite which might form during the lower temperature ranges. The starting mixture must not be heated above the fusion point of the mass, because in a molten mass, the individual constituents are free to move in every direction. On cooling a molten mass the highest melting point compounds will crystallize first on the outside of the body, while the lower melting point compounds, being still liquid are forced to the center of the body. As a result the final product is non-uniform in chemical composition and heterogeneous in physical structure.

As against this, by the practice of this invention, a corrected basic refractory is obtained that is uniform and homogeneous throughout, for at all times, the placement of its reaction products and the crystals formed have been under precise control. Also, by the placement of tiny crystals of reaction products well dispersed in the interstices between the periclase grains, the grains are so well bedded that they are prevented from slippage.

A heat-induced reaction between lime and silica in the proportions of two parts of lime to one part of silica yields a reaction-product (calcium orthosilicate) so refractory that it cannot be economically burned into a low porosity clinker. Nor can starting materials which yield a mixture of calcium orthosilicate with unreacted or free magnesia in the form of periclase be economically burned into a low porosity clinker.

Unless these materials (calcium orthosilicate and periclase) are heated to temperatures, which at the present time are so high as to be impractical and uneconomical, they are mutually inert, admixed, discrete crystalline masses. They may be likened to a mixture of sand and gravel, which will not stick together unless some cementing or bonding agent is provided. And so a mixture of calcium orthosilicate and periclase must be cemented together by a bonding agent that is in the liquid phase at normal burning temperatures. This agent, when this invention is practiced, is monticellite formed in situ.

But this is not all. The finished mass must be in both chemical and physical equilibrium. That is, all constituents in the starting mixture must, in the finished mass, have all their chemical requirements satisfied, with no residual free lime. This is accomplished by proportioning the starting materials and placing them, so that monticellite will be formed in addition to the calcium orthosilicate, without materially changing the placement of the materials.

By producing the monticellite in situ and in liquid phase while the refractory components (periclase and calcium orthosilicate) are yet in granular form, equilibrium is attained, because the monticellite, when in liquid phase, flows around and between the grains, so that when the monticellite hardens, it freezes or entraps or bonds the grains in immovable relationship, probably reacting with the surfaces of the calcium orthosilicate and periclase grains. Moreover, as the mass is heat-treated until all the chemical reactions have been completed and the compounds have reached equilibrium, the residual shrinkage has been burned out of the clinker.

Even when the cementing agent is formed in situ, there might be undesirable concentrations of it. Bits might be spotted between the refractory grains. When it goes into liquid phase, however, it flows out and covers the surfaces of the grains and equalizes the pressure between them. The internal stresses in the refractory body are relieved, and no further chemical or physical changes take place. When clinker of periclase and calcium orthosilicate plus the cementing monticellite formed in situ is ground and then shaped, no additional cementing agent needs to be added.

Moreover, with the cementing agent formed in situ so that there are no chemical or physical changes possible in the clinker, when it is ground and then fired into a brick, the cementing agent is thoroughly dispersed in and around the refractory grains with the result that a greatly superior brick is attained as compared with a brick made of ground clinker that has had a cementing agent mixed with it.

Having thus described, and having given examples of this invention, to which examples the invention is by no means limited, I claim:

1. A refractory clinker in which the chemical reactions are completed comprised of interspersed refractory grains of periclase and calcium orthosilicate cemented by monticellite placed in the interstitial spaces between the calcium orthosilicate grains and the periclase grains, with the entire mass uniform and in physical and chemical equilibrium.

2. The process of making a refractory which comprises mixing well in solid dispersion grains of dolomite with finely divided ground silica and lime in carefully calculated amounts, raising the temperature of the mix above that at which the dolomite is converted into lime and periclase and to which chemical reaction takes place between these ingredients but which temperature is below the fusion point of the mass, until calcium orthosilicate is first formed, and sequentially molten monticellite is formed in situ interstitially between the calcium orthosilicate and periclase grains while the materials retain their placement and assume both physical and chemical equilibrium, the monticellite in the liquid phase forming thin films between and around the grains of calcium orthosilicate and periclase, which films on cooling and solidifying cement the grains of calcium orthosilicate and periclase into a homogeneous mass; the silica and the lime-starting materials being calculated so that after the calcium orthosilicate is formed, there remains enough to form the desired quantity of monticellite but without any residual free lime or free silica.

3. The process of making refractory material from a lime-magnesia starting material which comprises adding thereto silica containing materials in an amount so that there is in the final product for each 56.07 parts of lime, more than 30.03 parts of silica but less than 35.00 parts of silica, and heating the mixture to a temperature below the fusion point of the mass and above the decomposition point of merwinite to convert the lime into calcium orthosilicate and monticellite without free lime and to convert the residual MgO to periclase.

4. The process of making a refractory material which comprises adding to dolomite sufficient silica to convert all the lime present to calcium orthosilicate and a controlled amount of monticellite, the amount of silica added being based upon a relationship indicated by multiplying by .536 the percentage of lime present in the dolomite for determining the exact amount of silica necessary to yield calcium orthosilicate, and then adding an additional 0.15% of silica for each per cent of monticellite desired in the end product; heating the mass to a temperature above that at which the dolomite is converted into lime and periclase until chemical reaction takes place between the ingredients present but which temperature is below the fusion point of the mass until there are yielded grains of periclase and calcium orthosilicate bonded by controlled amounts of monticellite formed and fused on the grains in situ leaving no residual free lime or silica.

GILBERT E. SEIL.